United States Patent
Martinez et al.

(10) Patent No.: US 11,693,435 B2
(45) Date of Patent: Jul. 4, 2023

(54) ETHERCAT LIQUID FLOW CONTROLLER COMMUNICATION FOR SUBSTRATE PROCESSING SYSTEMS

(71) Applicant: Applied Materials, Inc., Santa Clara, CA (US)

(72) Inventors: Ricardo Martinez, Manteca, CA (US);
Hung Xuan Hoang, Milpitas, CA (US);
Dmitry Sklyar, San Jose, CA (US);
Farooq Aleem, Cupertino, CA (US);
Jagan Rangarajan, Fremont, CA (US);
William Wadsworth, Santa Clara, CA (US); Brett Hoogensen, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/356,287

(22) Filed: Jun. 23, 2021

(65) Prior Publication Data

US 2021/0405665 A1 Dec. 30, 2021

Related U.S. Application Data

(60) Provisional application No. 63/044,309, filed on Jun. 25, 2020.

(51) Int. Cl.
*G05D 7/06* (2006.01)
*G05B 19/042* (2006.01)

(52) U.S. Cl.
CPC ......... *G05D 7/0676* (2013.01); *G05B 19/042* (2013.01); *G05B 2219/45096* (2013.01)

(58) Field of Classification Search
None
See application file for complete search history.

(56) References Cited

U.S. PATENT DOCUMENTS

2002/0173232 A1* 11/2002 Laursen ................. B24B 37/16
451/8
2004/0023606 A1* 2/2004 Wang ................... B24B 37/205
451/296

(Continued)

FOREIGN PATENT DOCUMENTS

| CN | 103521491 A | * 1/2014 | ............ B08B 11/04 |
| JP | 2015-179762 | 10/2015 | |
| WO | WO 2010/005702 | 1/2010 | |

OTHER PUBLICATIONS

International Search Report and Written Opinion in International Appln. No. PCT/US2021/038846, dated Oct. 18, 2021, 11 pages.

(Continued)

*Primary Examiner* — Mohammad Ali
*Assistant Examiner* — David Earl Ogg
(74) *Attorney, Agent, or Firm* — Fish & Richardson P.C.

(57) ABSTRACT

In a substrate processing system, such as a chemical mechanical system, updated controller configuration data is obtained for a plurality of liquid flow controllers of the substrate processing system. Each of a plurality of liquid flow controllers (LFCs) coupled to an Ethernet for Control Automation Technology (EtherCAT) bus automatically downloads a copy of the updated controller configuration data through the EtherCAT bus. Each of the plurality of liquid flow controllers controls fluid flow of a separate fluid line from a plurality of fluid lines in the substrate processing system, fluid flow through the plurality of fluid lines is controlled using the plurality of liquid flow controllers having the updated controller configuration data.

20 Claims, 4 Drawing Sheets

(56) References Cited

U.S. PATENT DOCUMENTS

| | | | |
|---|---|---|---|
| 2007/0197050 A1 | 8/2007 | Shirley et al. | |
| 2007/0197138 A1* | 8/2007 | Montierth | H01L 21/67046 |
| | | | 451/36 |
| 2007/0298689 A1* | 12/2007 | Wang | B24B 53/017 |
| | | | 451/28 |
| 2008/0003931 A1* | 1/2008 | Manens | B24B 37/30 |
| | | | 451/444 |
| 2012/0009847 A1* | 1/2012 | Menk | B24B 37/005 |
| | | | 451/5 |
| 2013/0111456 A1* | 5/2013 | Bonnell | G06F 9/44536 |
| | | | 717/170 |
| 2014/0141695 A1* | 5/2014 | David | B24B 37/013 |
| | | | 451/11 |
| 2015/0079881 A1 | 3/2015 | Maruyama et al. | |
| 2016/0092701 A1* | 3/2016 | Shah | H04L 9/3247 |
| | | | 713/189 |
| 2016/0117162 A1* | 4/2016 | Searle | H04L 41/40 |
| | | | 717/173 |
| 2017/0239778 A1 | 8/2017 | Maruyama et al. | |
| 2018/0304435 A1 | 10/2018 | Xu et al. | |
| 2020/0042021 A1* | 2/2020 | Somani | G01F 1/6847 |

OTHER PUBLICATIONS wikipedia.com [online], "EtherCAT," Jun. 5, 2020, retrieved on Oct. 29, 2021, retrieved from URL <https://en.wikipedia.org/wiki/EtherCAT>, 9 pages.

* cited by examiner

ETHERCAT LIQUID FLOW CONTROLLER COMMUNICATION FOR SUBSTRATE PROCESSING SYSTEMS

CROSS-REFERENCE TO RELATED APPLICATIONS

This application claims priority to U.S. Application Ser. No. 63/044,309, filed on Jun. 25, 2020, the disclosure of which is incorporated by reference.

TECHNICAL FIELD

The present disclosure relates to liquid flow controllers, and more specifically to management of liquid flow controllers for substrate processing systems, e.g., chemical mechanical polishing systems.

BACKGROUND

A flow controller can be used to deliver process gas or liquid for serving various processes. For example, in the semiconductor industry, liquid flow controllers are used to deliver liquid chemistries to wafer fabricating tools. In particular, during chemical mechanical polishing (CMP), a polishing liquid, such as slurry with abrasive particles, is supplied to the surface of a rotating polishing pad. A substrate is mounted on a carrier head and an exposed surface of the substrate is placed the polishing pad. The combination of relative motion and abrasive particles results in planarization of the substrate surface.

Each liquid flow controller needs to be configured before or while being used to deliver liquid. For example, the configuration can include controller firmware. As another example, the configuration can include commands that specify liquid type, flow rate, and/or setpoint. Different liquid flow controllers can have different configurations. Traditionally, the liquid flow controllers are configured manually.

SUMMARY

In one aspect, a chemical mechanical polishing apparatus includes a plurality of plurality of polishing stations, a plurality of carrier heads, an Ethernet for Control Automation Technology (EtherCAT) bus, a liquid flow controller array, and a control system. Each polishing station includes a platen to support a polishing pad and a polishing liquid dispenser to deliver a polishing liquid from a polishing liquid supply through a port onto the polishing pad. The plurality of carrier heads are movable between the polishing stations to hold a substrate against a selected polishing pad. The liquid flow controller array includes a plurality of independently controllable liquid flow controllers (LFCs) coupled to an Ethernet for Control Automation Technology (EtherCAT) bus, and the plurality of LFCs includes a first multiplicity of LFCs with each respective LFC of the first multiplicity of LFCs controlling flow of polishing liquid from the polishing liquid supply to a respective port. The control system is configured to obtain updated controller configuration data for the plurality of LFCs, and send commands in sequence automatically through the EtherCAT bus to each of the plurality of LFCs to cause each of the LFCs in sequence to download a copy of the updated controller configuration data through the EtherCAT bus.

In another aspect, a computer program product includes instructions to cause one or more processors to receive updated controller configuration data for a plurality of liquid flow controllers of the substrate processing system, send commands in sequence automatically through an Ethernet for Control Automation Technology (EtherCAT) bus to each of a plurality of liquid flow controllers (LFCs) to cause each of the LFCs in sequence to download a copy of the updated controller configuration data through the EtherCAT bus, and cause the substrate processing system to process a substrate with fluid flow through each of a plurality of fluid lines in the substrate processing system controlled by a respective LFC having the updated controller configuration data.

Certain implementations can include one or more of the following advantages. Efficiency in configuring liquid flow controllers can be improved, e.g., in terms of fabrication facility operator time. Costly downtime due to controller failures caused by human errors at input or information loss during data transmission can be reduced, thus reducing cost of operation.

The details of one or more implementations are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

A chemical mechanical polishing system may need to independently control flow of liquid through one to two dozen liquid supply lines. Examples of such liquid supply lines include a polishing liquid supply line (e.g., one or more for each polishing station), a polishing pad rinsing fluid supply line (e.g., again, one for each polishing station), a substrate washing fluid supply line for spraying the substrate at a transfer station, a buffing solution supply line for a pre-clean buffing station, a substrate cleaning fluid supply line (e.g., one for each cleaning device, such as a brush cleaner and/or megasonic cleaner), and a drying liquid supply line (e.g., for a Marangoni drier).

A liquid delivery system for a chemical mechanical polishing system needs a separate liquid flow controller for each line, e.g., one to two dozen or more liquid flow controllers. One problem in operating the liquid flow controllers resides in the time-consuming nature of the manual configuration process. Manually setting respective parameter values of each of multiple, e.g., tens or hundreds of, liquid flow controllers that collectively define the operation of the liquid delivery system may oftentimes be far too slow in terms of operator time. Another problem in operating the liquid flow controllers is sensitivity to human or machine errors, e.g., inadvertent mistakes made by a human operator when inputting commands to configure each liquid flow controller, or errors that occur during data storage or transmission.

By allowing each of the multiple liquid flow controllers to automatically download a copy of configuration data from a server and thereafter using cryptographic hashing techniques to ensure data integrity of the downloaded copy, efficiency in configuring liquid flow controllers can be improved, and costly downtime due to controller failures caused by human errors at input or information loss during data storage or transmission can be reduced, thus reducing cost of operation.

Figure 1A:
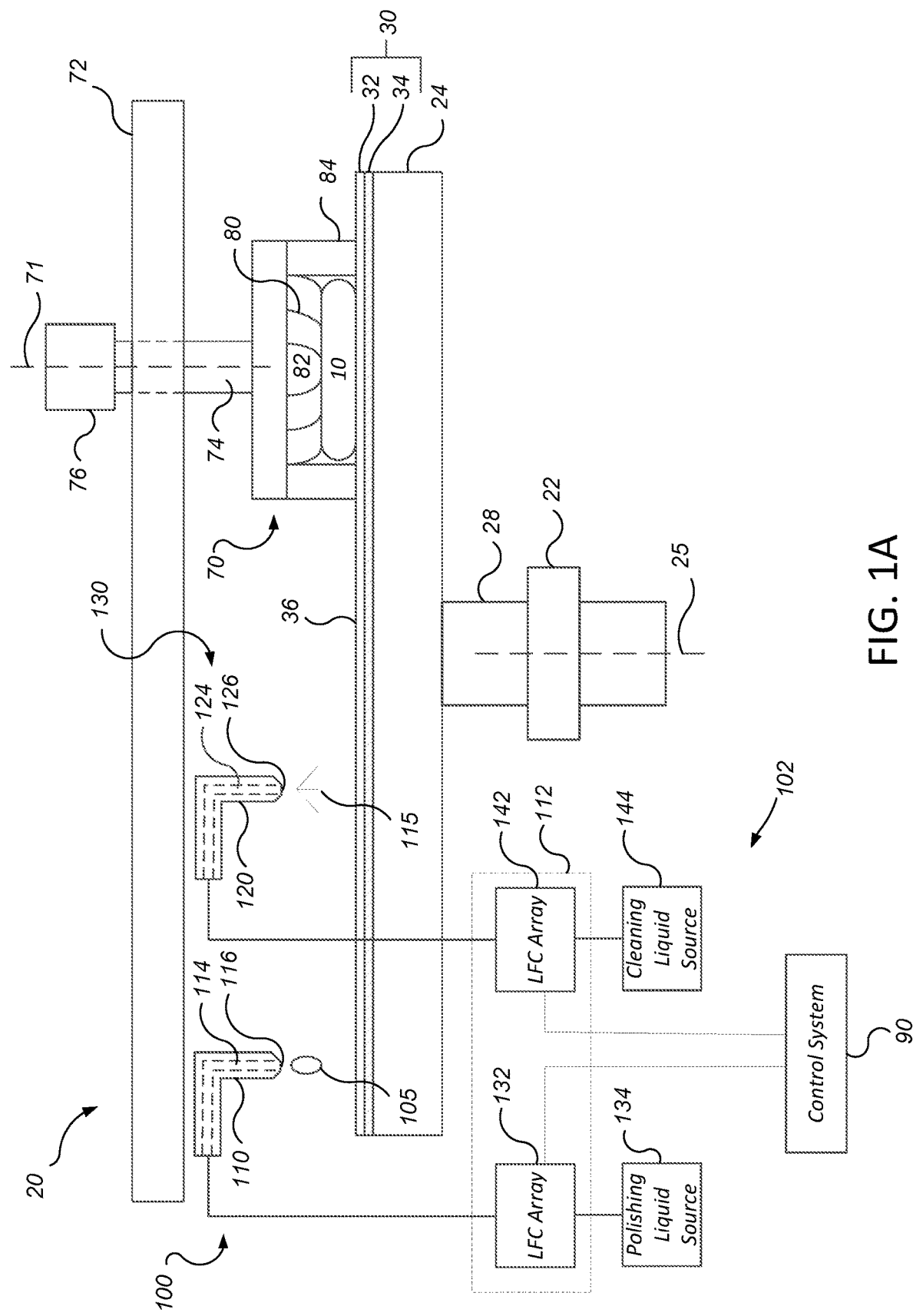
FIG. 1A is a schematic side view, partially cross-sectional, of a chemical mechanical polishing station that includes a polishing liquid distribution system.
Figure 1B:
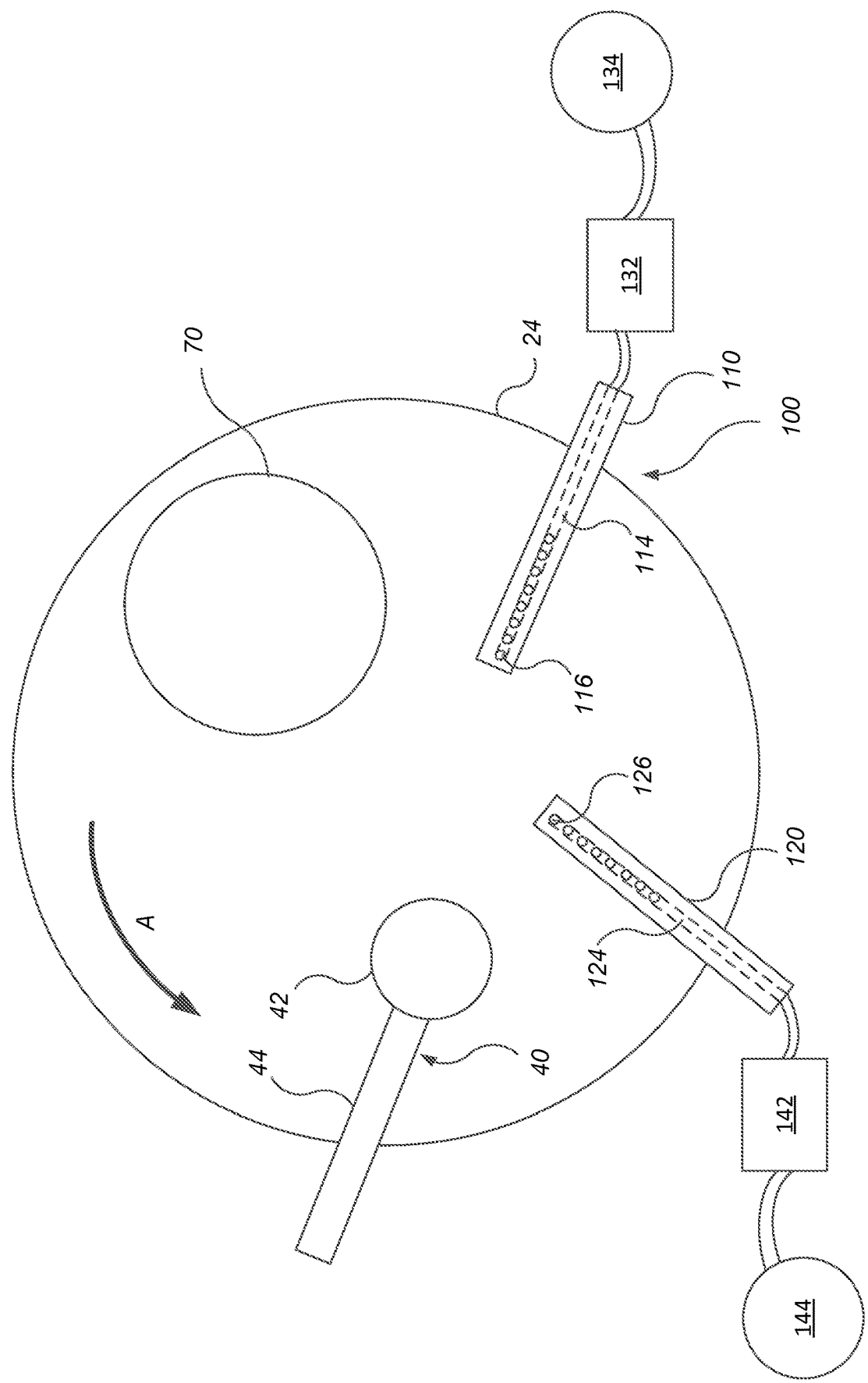
FIG. 1B is a schematic top view of the chemical mechanical polishing station of FIG. 1A.

FIGS. 1A-B illustrate an example of a polishing station 20 of a chemical mechanical polishing apparatus. The polishing station 20 includes a rotatable disk-shaped platen 24 on which a polishing pad 30 is situated. The platen 24 is operable to rotate about an axis 25. For example, a motor 22 can turn a drive shaft 28 to rotate the platen 24. For example, as shown in FIG. 1B, the platen 24 can rotate counter-clockwise as shown by arrow A. The polishing pad 30 can be a two-layer polishing pad with a polishing layer 32 and a softer backing layer 34.

The polishing station 20 can include a pad conditioner apparatus 40 with a conditioning disk 42 to maintain the condition of the polishing pad 30 (see FIG. 1B). The conditioning disk 42 may be positioned at the end of an arm 44 that can move the disk 42 radially across the polishing pad 30.

The carrier head 70 is operable to hold a substrate 10 against the polishing pad 30. The carrier head 70 is suspended from a support structure 72, e.g., a carousel or a track, and is connected by a drive shaft 74 to a carrier head rotation motor 76 so that the carrier head can rotate about an axis 71. Optionally, the carrier head 70 can oscillate laterally, e.g., on sliders on the carousel or track 72; or by rotational oscillation of the carousel itself. In operation, the platen is rotated about its central axis 25, and the carrier head is rotated about its central axis 71 and translated laterally across the top surface of the polishing pad 30. Where there are multiple carrier heads, each carrier head 70 can have independent control of its polishing parameters, for example each carrier head can independently control the pressure applied to each respective substrate.

The carrier head 70 can include a flexible membrane 80 having a substrate mounting surface to contact the back side of the substrate 10, and a plurality of pressurizable chambers 82 to apply different pressures to different zones, e.g., different radial zones, on the substrate 10. The carrier head can also include a retaining ring 84 to hold the substrate.

The polishing system also includes a liquid delivery system 102 for control of various liquids to the polishing station (and to the cleaning or other unillustrated components) of the polishing system 20. The liquid delivery system 102 includes a liquid flow controller (LFC) array 112 which includes an independently controllable LFC for each of multiple liquid delivery lines. As will be described in more detail below with reference to FIGS. 2-3, some or all of the individual LFCs within the LFC array 112 are each a respective EtherCAT LFC that is capable of automatically downloading LFC configuration data from a control server.

As part of the liquid delivery system 102, a polishing liquid distribution system 100 delivers and spreads a polishing liquid 105, e.g., an abrasive slurry, on the surface of the polishing pad 30. The polishing liquid distribution system 100 includes a dispenser 110 and a liquid flow controller (LFC) array 132.

The dispenser 110 includes one or more passages (i.e., fluid lines) 114 having one or more ports 116 positioned over the polishing pad 30. For example, the dispenser 110 can include a rigid body through which the passage 114 extends, or the dispenser 110 can include flexible tubing supported by an arm. In either case, one or more holes or nozzles coupled to the passage 114 can provide the ports 116 (see FIG. 1B).

The LFC array 132, in turn, includes one or more liquid flow controllers (LFCs). For example, the polishing liquid distribution system 100 can include one LFC for each passage 114 of the dispenser 100. However, the LFCs need not have a one-to-one correspondence with passages. Each LFC can receive an input flow of polishing liquid from polishing liquid source 134 and produce an output flow of polishing liquid directed to a passage 114.

Optionally, the liquid delivery system 102 of the polishing station 20 also includes a cleaning liquid distribution system 130 that delivers and spreads a cleaning liquid, e.g., water, at high intensity onto the polishing pad 30 to wash the pad 30 and remove used slurry, polishing debris, etc.

To deliver the cleaning liquid 115 from a cleaning liquid source 144 to the polishing pad 30, the cleaning liquid distribution system 130 similarly includes a dispenser 120 that includes one or more passages 124 having one or more ports 126 positioned over the polishing pad 30, and a liquid flow controller (LFC) array 142 that includes one or more liquid flow controllers (LFCs) each configurable to receive an input flow of cleaning liquid from cleaning liquid source 144 and produce an output flow of cleaning liquid directed to a passage 124.

Specifically, the LFC array 112 is managed by a control system 90 that sends control signals to (and optionally receives data from) the individual LFCs. In particular, the control system 90 can store and execute a recipe that controls the flow rate through each LFC as a function of time. Optionally, measurements from a flow rate monitoring system, including, for example, voltage measurements indicating respective flow rates as well as valve position for each individual LFC, are fed to the control system 90, for feedback control on the flow rates through the LFCs. Thus, the control system 90 can executes a control algorithm and provide control signals to implement any changes to the respective flow of liquid through each individual LFCs within the LFC array 112.

In this way, the control system 90 can control the flow rates of polishing liquid 105 from the polishing liquid source 134, and control the flow rates of cleaning liquid 115 from the cleaning liquid source 144. In a similar way, the control system 90 can also control the polishing liquid composition supplied to the polishing pad, and control the cleaning liquid composition supplied to the polishing pad 30.

Although not illustrated, the LFC array 112 can include one or more LFCs coupled to the control system 90 to control the flow rate of a substrate washing fluid supply line for spraying the substrate at a transfer station, a buffing solution supply line for delivering a buffing solution to a pre-clean buffing station, one or more substrate cleaning fluid supply lines for supplying cleaning fluid to one or more cleaning devices, such as a brush cleaner and/or megasonic cleaner, and/or a drying liquid supply line, e.g., for a Marangoni drier.

The control system 90 can also be connected to the pressure mechanisms that control the pressure applied by carrier head 70, to carrier head rotation motor 76 to control the carrier head rotation rate, to the platen rotation motor 21 to control the platen rotation rate.

Figure 2:
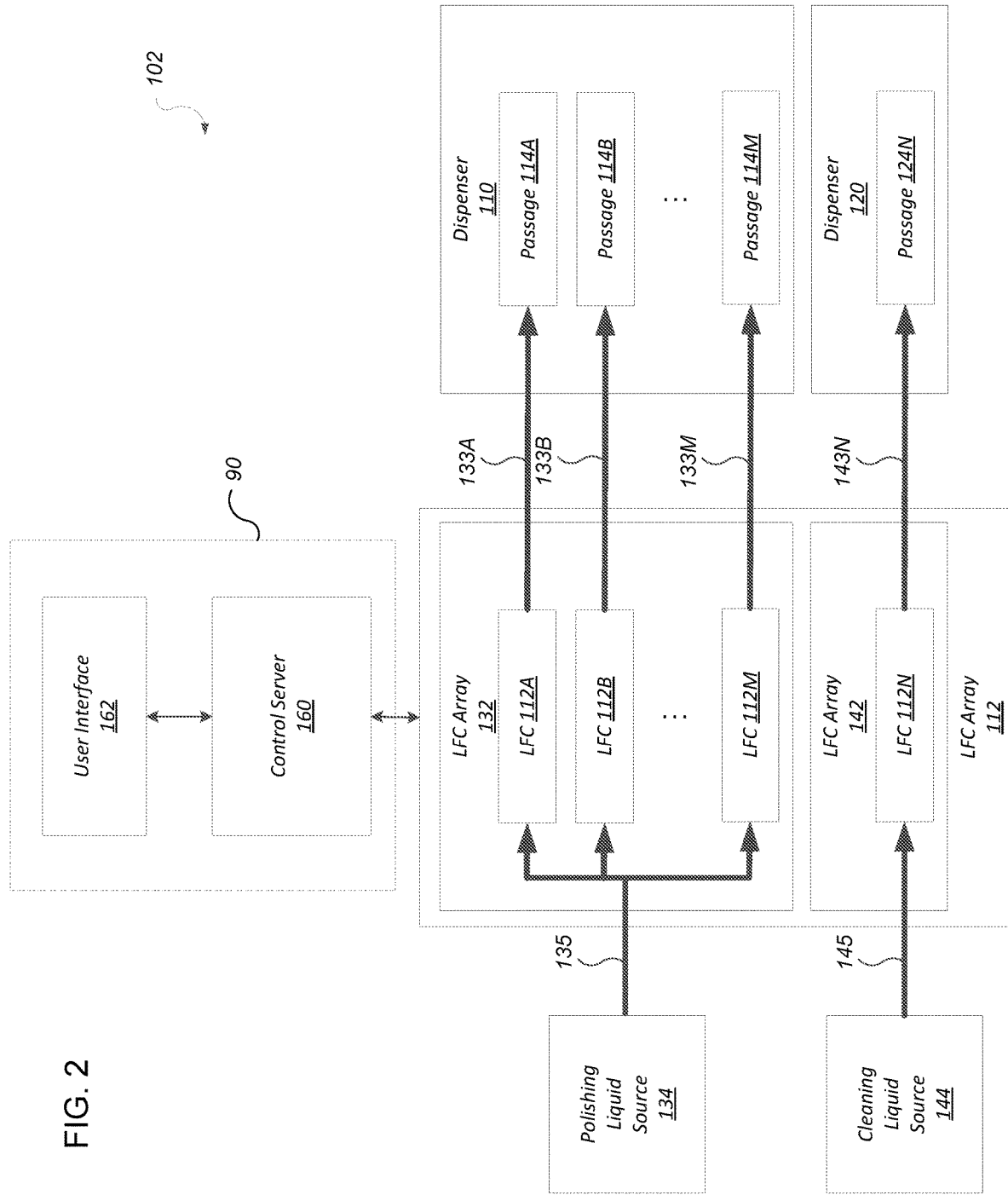
FIG. 2 is a block diagram illustrating the liquid delivery system of FIG. 1A.

FIG. 2 is a block diagram illustrating the liquid delivery system 102 of FIG. 1A. The liquid delivery system 102 includes the control system 90 and the LFC array 112. The control system 90, in turn, can include a control server 160 and a user interface 162. The LFC array 112 can include the LFC array 132 which connects the polishing liquid source 134 and the dispenser 110. In cases where the liquid delivery system 102 also includes a cleaning liquid distribution system, the LFC array 112 can also include the LFC array 142 which connects the cleaning liquid source 144 and the dispenser 120, i.e., either in place of or in addition to the LFC array 132.

The LFC array 112 is a multi-channel liquid flow control apparatus that includes an array of one or more individual LFCs, e.g., LFC 112A-112N, where N represents the total number of individual liquid flow controllers for the polishing system. N can be 2 or more, e.g., 12 or more, e.g., 20 to 50. Each of the liquid flow controllers 112A-N in the LFC array 112 can receive an input flow of liquid, e.g., input flow 135 from the polishing liquid source 134, and produce an output flow, e.g., output flow 133A, directed to a corresponding passage, e.g., passage 114A of the dispenser 110.

Each of the LFCs in the LFC array 112 includes processing logic that can comprise hardware (e.g., circuitry, dedicated logic, programmable logic, microcode, etc.), software (e.g., instructions run on a processing device), or a combination thereof that can handle processing involved in measurement of flow readings, valve positions, or both of the LFC. For example, the processing logic can receive a valve voltage reading, e.g., from a flow reading module of the LFC, that is indicative of the total flow of that LFC and then use the total flow reading in a real-time valve voltage control algorithm. The term "valve voltage control algorithm" is intended to refer to a portion of the processing logic that is responsible for maintaining a predetermined valve voltage "recipe." As another example, the processing logic can receive a voltage reading, e.g., from a valve position module of the LFC, that is indicative of the valve position of that LFC and then use the valve position reading in the real-time valve position control algorithm. The term "valve position control algorithm" is intended to refer to a portion of the processing logic that is responsible for maintaining a predetermined valve position "recipe."

Some or all of the individual LFCs 112A-N are EtherCAT LFCs. In particular, the LFCs are EtherCAT LFCs that allow for automatic LFC configurating. That is, the LFC array 132 is coupled to the control server 160 via an Ethernet for Control Automation Technology (EtherCAT) bus. The LFC array 112 is programmed and/or has circuitry that in operation automatically downloads controller configuration data through the EtherCAT bus, i.e., instead of being manually configured, and thereafter controls applicable LFCs within the LFC array 112 in accordance with the automatically downloaded controller configuration data.

The control server 160 can handle processing involved in making flow adjustments to the LFC array 112. The control server 160 can implement algorithms for monitoring information received from the LFC array 112 in order to detect flow conditions present in the LFC array 112 that require an adjustment. For example, the control server 160 can detect and correct flow instabilities in the LFC array 112. As another example, the control server 160 can make a flow adjustment to the LFC array 112 based on a command entered into the user interface 162.

In some implementations, the control server 160 can directly send setpoint commands to applicable LFCs in the LFC array 112 via the EtherCAT bus. For example, prior to the commencement of operation, the control server 160 can send initial setpoint commands to the LFC array 112 via the EtherCAT bus. As another example, if it is determined that a change in flow is required, the control server 160 can send updated flow setpoint commands to the LFC array 112 via the EtherCAT bus. As yet another example, if it is determined that a change in valve position is required, the control server 160 can send updated valve position setpoint commands to the LFC array 112 via the EtherCAT bus.

In some implementations, the control server 160 can directly send a new firmware to the LFC array 112, e.g., as part of a service routine, that may be used to update and/or replace the existing firmware that currently reside in an individual LFC within the LFC array 112.

The user interface 162 can be variously configured with different functionality to enable a user to provide input to the control server 160. Additionally, the user interface 162 can be configured to provide information to a user regarding status of the control server 162. In one embodiment, the user interface 162 can display the desired total flow recipe, the current total flow readings, the individual errors for any LFC, the total error for the LFC array 112, or any combination thereof. In another embodiment, the user interface 162 can be used to terminate flow operations through the LFC array 112.

The control server 160 and the user interface 162 can be individually hosted by any type of computing device including server computers, gateway computers, desktop computers, laptop computers, tablet computer, notebook computer, hand-held computers, or similar computing device. Alternatively, any combination of the control server 160 and the user interface 162 can be hosted on a single computing device including server computers, gateway computers, desktop computers, laptop computers, mobile communications devices, cell phones, smart phones, hand-held computers, or similar computing device.

Figure 3:
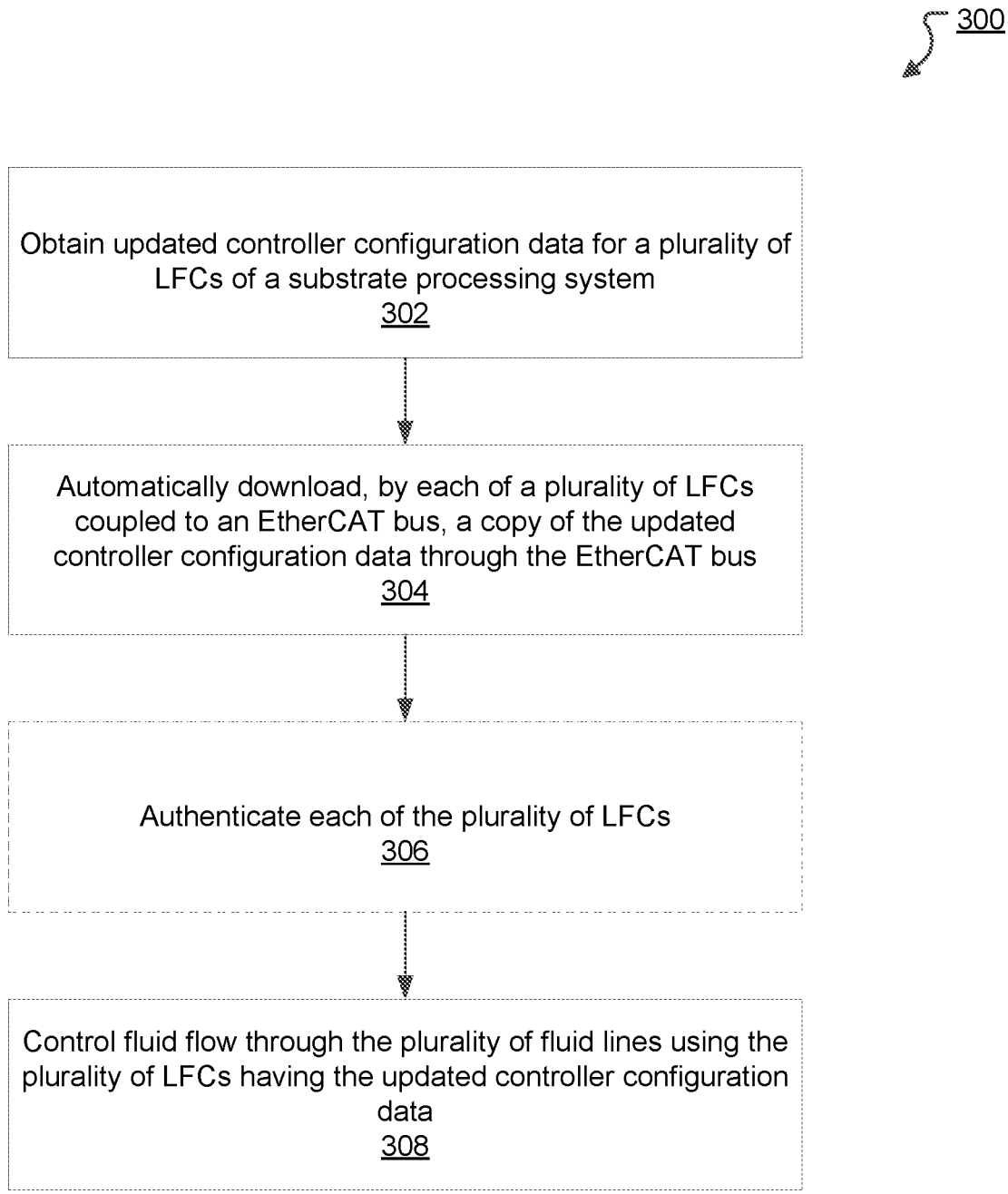
FIG. 3 is a flow diagram of an example process for operating the chemical mechanical polishing station of FIG. 1A.

FIG. 3 is a flow diagram of an example process 300 for operating the chemical mechanical polishing station of FIG. 1A. The process 300 can be performed by processing logic that can comprise hardware (e.g., circuitry, dedicated logic, programmable logic, microcode, etc.), software (e.g., instructions run on a processing device), or a combination thereof. In one embodiment, the process 300 is performed by control system 90 of FIG. 1A.

The process 300 may be repeated as often as necessary to obtain the most recent LFC configurations from the control server 160. For example, the process 300 may be repeated once a day, or once a week, or once a month. The process 300 can be triggered by receipt of a new update at the control system so that the process is repeated every time there is a new update to the configuration of the LFC array.

The process 300 includes obtaining updated controller configuration data at the control server for a plurality of liquid flow controllers of the substrate processing system (302). The control system can obtain the updated control configuration data from another system or from an operator of the control system, e.g., as a command entered into the user interface. Alternatively, the control system can automatically produce the updated control configuration data from existing data maintained by the system.

The controller configuration data generally refers to any information related to the operation of the LFC array. For example, the controller configuration data includes at least one value for at least one controller parameter, e.g., a flow rate, maximum valve opening, control loop coefficients (e.g., one or more coefficients for a proportional-integral-derivative controller). As another example, the controller configuration data includes controller firmware, e.g., a version update of the controller firmware.

The process 300 includes automatically downloading, from the control server by each of a plurality of liquid flow controllers (LFCs) coupled to an Ethernet for Control Automation Technology (EtherCAT) bus, a copy of the updated controller configuration data through the EtherCAT bus (304). In other words, each of the plurality of LFCs are capable of receiving updated configuration data without the need of being manually configured.

Typically, each of the plurality of LFCs controls fluid flow of a separate passage (i.e., fluid line) from a plurality of passages in the polishing station 20 of FIG. 1A. For example, as shown in FIG. 1A, each LFC can be an individual LFC within the LFC array 132 connecting the polishing liquid source 134 and a passage 114 within the dispenser 110, or an individual LFC within the LFC array 142 connecting the cleaning liquid source 144 and a passage 124 within the dispenser 120.

Optionally, the process 300 also includes authenticating each of the plurality of LFCs (306). Authentication can include exchange of encrypted credentials. A sample hardware authentication involves verification by the control system of a LFC's reported switch ID, product code, and supplier ID. If any one of these responses from the LFC don't match expected values, the LFC won't be able to be operated. In addition, a sample software authentication involves passing of feature activation and verification seeds and keys between control system and LFC to verify the authenticity of the LFC.

The process 300 includes controlling the fluid flow through the plurality of fluid lines using the plurality of liquid flow controllers having the updated controller configuration data (308). For example, if the updated controller configuration data specifies a new flow rate for each of one or more of the LFCs, the electronic circuitries can send control signals to adjust respective valve positions of the LFCs so that each of the one or more LFCs can produce output flows at the new flow rate.

In some embodiments, prior to do so, the control system first confirms that each LFC has updated to use the updated controller configuration data. For a variety of reasons, there is a chance of a file being corrupted due, e.g., for a few bits to be missing, during the data transfer through the EtherCAT bus. To ensure that a complete, unaltered version of the controller configuration data has been downloaded to each of the plurality of LFCs, the control system can verify the integrity of each downloaded copy of the controller configuration data by computing a checksum value for the copy and then comparing it with a precomputed checksum value for the configuration data that is stored at the control server to determine whether the two values are identical. For example, the checksum value is a MD5 or SHA-1 checksum value. The control system can confirm the integrity of the downloaded copy in response to a positive determination. On the contrary, in response to a negative determination, the control system can refrain from controlling the fluid flow according to the downloaded copy of updated controller configuration data and instead repeat step 304 to re-download a new copy of the updated configuration data.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A chemical mechanical polishing apparatus, comprising:
    a plurality of polishing stations, wherein each polishing station includes a platen to support a polishing pad and a polishing liquid dispenser to deliver a polishing liquid from a polishing liquid supply through a port onto the polishing pad;
    a plurality of carrier heads movable between the polishing stations to hold a substrate against a selected polishing pad;
    an Ethernet for Control Automation Technology (EtherCAT) bus;
    a liquid flow controller array including a plurality of independently controllable liquid flow controllers (LFCs) coupled to an Ethernet for Control Automation Technology (EtherCAT) bus, the plurality of LFCs including a first multiplicity of LFCs with each respective LFC of the first multiplicity of LFCs controlling flow of polishing liquid from the polishing liquid supply to a respective port;
    a control system configured to
        obtain updated controller configuration data for each of the plurality of LFCs, wherein the updated controller configuration data for at least one of the plurality of LFCs is different from the updated controller configuration data for another one of the plurality of the LFCs and
        send commands in sequence automatically through the EtherCAT bus to each of the plurality of LFCs to cause each of the LFCs in sequence to download a copy of the updated controller configuration data through the EtherCAT bus.

2. The apparatus of claim 1, wherein each polishing station includes a cleaning liquid dispenser to deliver a cleaning liquid through a respective port to clean the polishing pad, and the plurality of LFCs includes a second multiplicity of LFCs with each respective LFC of the second multiplicity of LFCs controlling flow of the cleaning liquid from a rinsing liquid supply to the respective port.

3. The apparatus of claim 1, wherein each polishing station includes a temperature control liquid dispenser to deliver a heated or cooled liquid to the polishing pad to control through a respective port, and the plurality of LFCs includes a second multiplicity of LFCs with each respective LFC of the second multiplicity of LFCs controlling flow of the heated or cool liquid to the respective port.

4. The apparatus of claim 1, comprising a transfer station and washing liquid dispenser to deliver a washing liquid through a respective port onto a substrate positioned at the transfer station, and the plurality of LFCs includes a second LFC to control flow of the washing liquid to the respective port.

5. The apparatus of claim 1, comprising one or more cleaning and/or drying stations to clean and/or dry substrates after the substrates have been polished at one or more of the polishing stations, the cleaning and/or drying stations selected from a group including a pre-clean buffing station, a brush cleaner, a megasonic cleaner, and a Marangoni drier, and the plurality of LFCs includes one or more second LFC to control flow of a cleaning and/or drying liquid to a respective port in a respective cleaning and/or drying station.

6. The apparatus of claim 1, wherein the plurality of LFCs has ten to fifty LFCs.

7. The apparatus of claim 1, wherein the controller configuration data comprises at least one value for at least one controller parameter.

8. The apparatus of claim 7, wherein the at least one controller parameter comprises a flow rate.

9. The apparatus of claim 1, wherein the controller configuration data comprises controller firmware.

10. The apparatus of claim 9, wherein the controller firmware comprises a version update of the controller firmware.

11. A method of operating a substrate processing system, comprising:
  obtaining updated controller configuration data for each of a plurality of liquid flow controllers (LFCs) of the substrate processing system, wherein the updated controller configuration data for at least one of the plurality of LFCs is different from the updated controller configuration data for another one of the plurality of the LFCs;
  automatically downloading, by each of a plurality of LFCs coupled to an Ethernet for Control Automation Technology (EtherCAT) bus, a copy of the updated controller configuration data through the EtherCAT bus, each of the plurality of liquid flow controllers controlling fluid flow of a separate fluid line from a plurality of fluid lines in the substrate processing system; and
  controlling fluid flow through the plurality of fluid lines using the plurality of liquid flow controllers having the updated controller configuration data.

12. The method of claim 11, wherein the controller configuration data comprises at least one value for at least one controller parameter.

13. The method of claim 12, wherein the at least one controller parameter comprises a flow rate.

14. The method of claim 11, wherein the controller configuration data comprises controller firmware.

15. The method of claim 14, wherein the controller firmware comprises a version update of the controller firmware.

16. A computer program product, tangible embodied in a non-transitory computer readable media, comprising instructions to cause one or more processors to:
  receive updated controller configuration data for a plurality of liquid flow controllers of a substrate processing system;
  send commands in sequence automatically through an Ethernet for Control Automation Technology (EtherCAT) bus to each of a plurality of liquid flow controllers (LFCs) to cause each of the LFCs in sequence to download a copy of the updated controller configuration data through the EtherCAT bus; and
  cause the substrate processing system to process a substrate with fluid flow through each of a plurality of fluid lines in the substrate processing system controlled by a respective LFC having the updated controller configuration data.

17. The computer program product of claim 16, comprising instructions to confirm that each LFC has updated to use the updated controller configuration data.

18. The computer program product of claim 17, wherein the instructions to confirm include instructions to receive a checksum from each LFC through the EtherCAT bus and compare the checksum to a stored checksum value.

19. The computer program product of claim 17, comprising instructions to generate a notification to a user verifying that each LFC has updated to use the updated controller configuration data.

20. The computer program product of claim 16, comprising instructions to authenticate each of the plurality of LFCs.

* * * * *